June 19, 1928.
V. MOORE
AUTOPLANE
1,674,338
Original Filed June 17, 1925   2 Sheets-Sheet 2
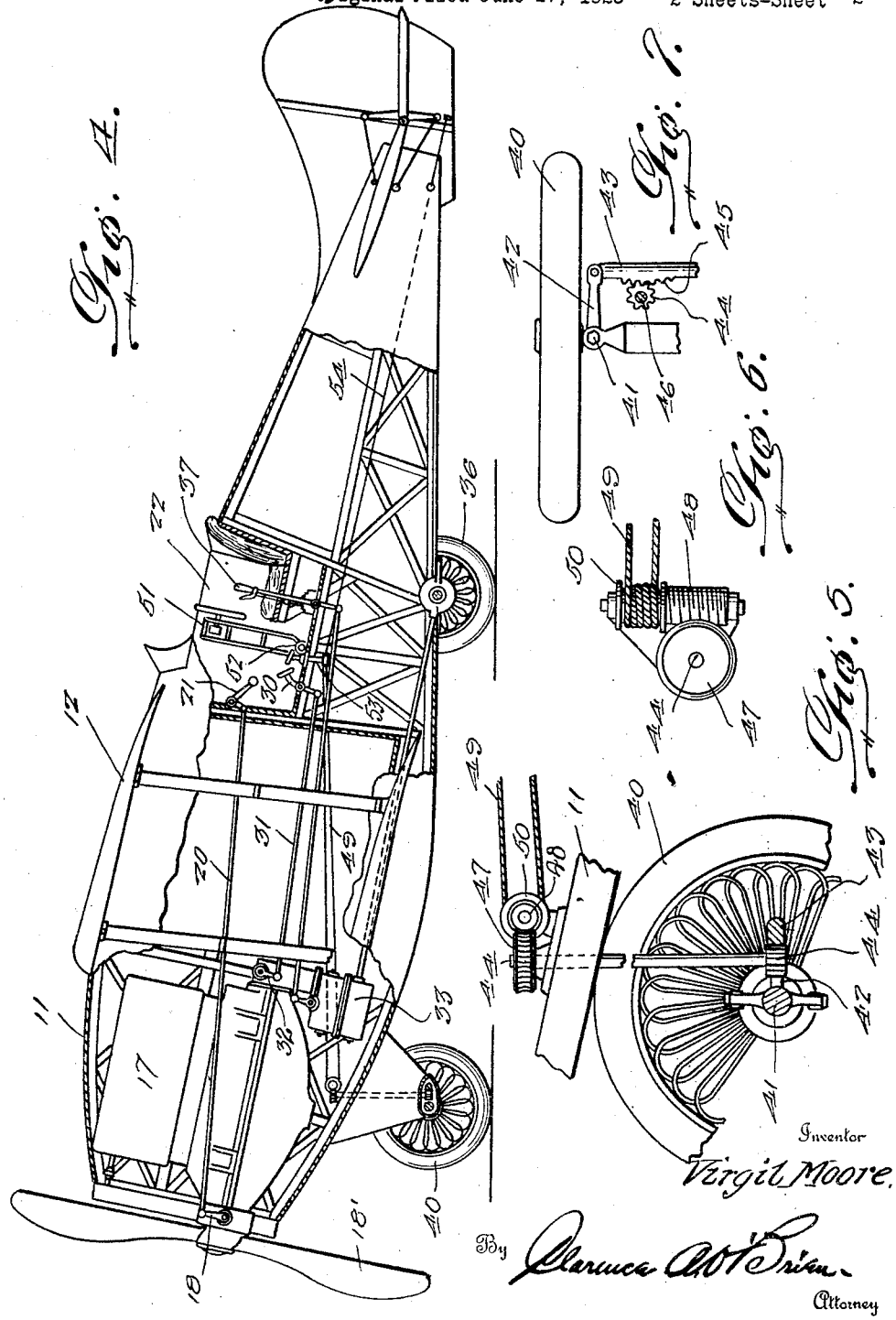

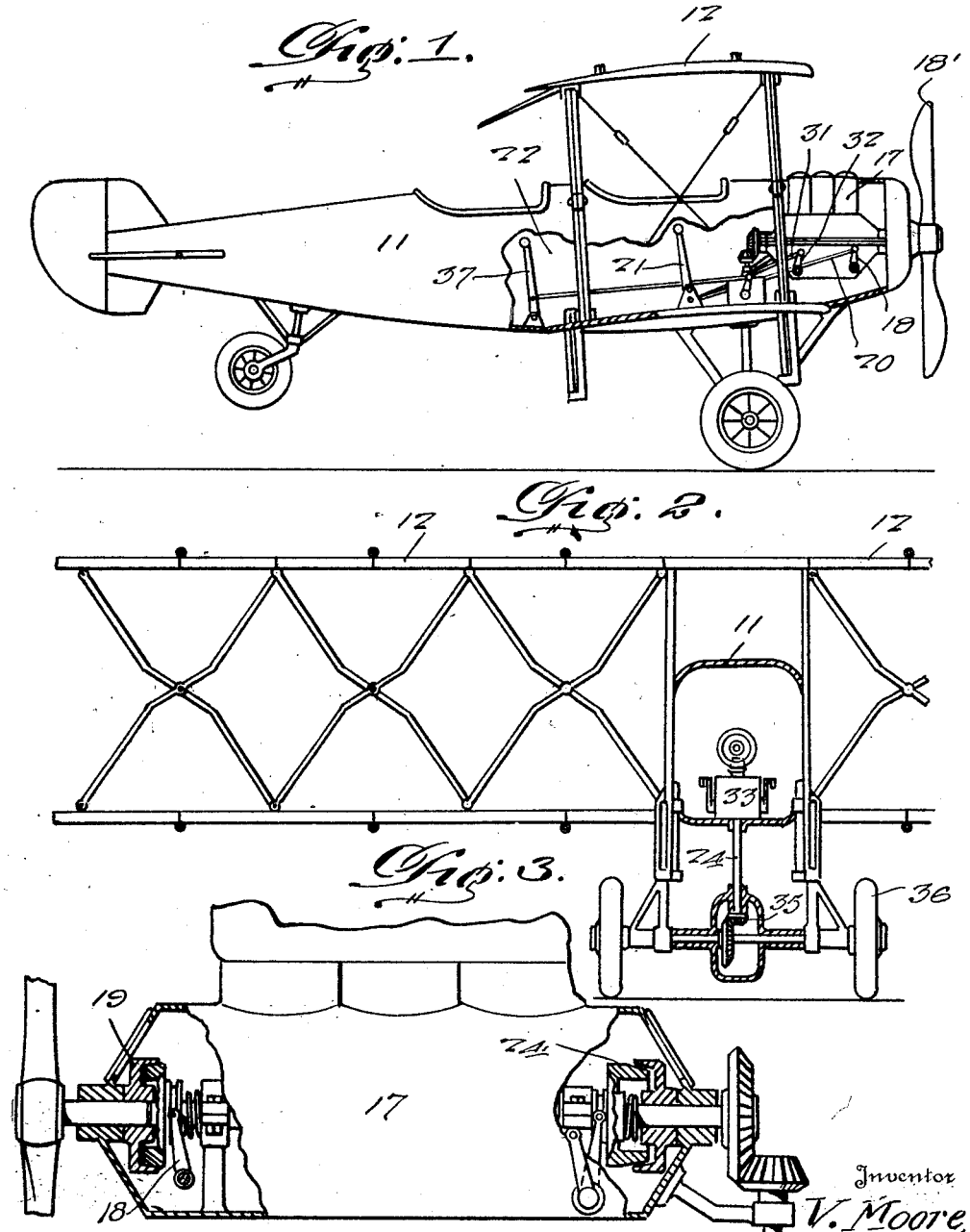

Patented June 19, 1928.

1,674,338

UNITED STATES PATENT OFFICE.

VIRGIL MOORE, OF TULSA, OKLAHOMA.

AUTOPLANE.

Application filed June 17, 1925, Serial No. 37,743. Renewed October 28, 1927.

The object of my invention is to provide a vehicle that is adapted to both ground and air travel, the advantage of which will become evident in the following disclosures of the specification.

This object I attain in the provision of a stream line body or chassis, equipped with wheels for ground travel and wings for aerial travel, driving means being provided through certain of the wheels for ground travel and through a releasable propeller for flight.

With the above and numerous other objects in view, as will appear as the description proceeds, the invention resides in certain novel features of construction, and in the combination and arrangement of parts as will be hereinafter more fully described and claimed.

In the drawing:

Figure 1 is an elevation of an autoplane embodying the features of my invention, Figure 2 is a vertical section taken transversely therethrough.

Figure 3 is an enlarged fragmentary view of the engine, showing the ends of the crank case in section for disclosing clutches associated with the drive shaft.

Figure 4 is an elevation and section of an autoplane embodying the features of my invention, showing a wheeled steering apparatus associated therewith.

Figure 5 is a detail view of the steering apparatus.

Figure 6 is a detail top plan view of a portion of the steering apparatus, and

Figure 7 is a detail view, showing in top plan one wheel and the steering means associated therewith.

In the present state of development, transportation comprises two primary divisions; that upon the firmament which includes travel upon land and sea and that of the air accomplished by the use of the present buoyant and non-buoyant machines. In my invention, I present a vehicle which will combine both of these modes of transportation and make it possible for a cargo, either human or inert to be loaded at some point within a city, and from thence proceed through the city streets at a speed equal to that of an automobile to a landing field, at the city boundaries, wherefrom the trip is resumed through the air. In order that this may be accomplished, I have equipped my vehicle with a means of road travel and also with a means by which it may travel through the air; the first being provided by the use of power driven wheels, upon which it may be propelled and steered, and the second by use of wings, normally retracted for city and road traffic, but which may be extended, as desired, to provide for aerial flight, combined with a releasable propeller, thus producing a combined automobile and aeroplane.

In the accomplishment of the before stated object, I employ a body 11, which is of stream line construction, from which are extended the wing members 12 which are foldable so as to be retracted or extended, such as is shown in Letters Patent issued to me #1,495,029, on the 20th day of May, 1924.

The motor 17, which is of super power and extremely long life type is located in the forward part of the body. The propeller 18', which provides a driving means while in flight, is driven through the releasable clutch 19, which is operated through the rod 20 and lever 21, the latter being located in the cock-pit 22 of the body. The operating lever 21 acts through an arc, and in so doing throws the operating crank 18 of the clutch 19 through a partial revolution around the shaft upon which it is located.

It is intended that the body shall be of a shape that will bring the center of revolution of the propeller as near coincident with the longitudinal axis of the fuselage as a possible, in order that the pull of the propeller while in rotation will have but little effect upon the inherent stability of the entire structure. This is accomplished by introducing the upward curve into the under part of the body 11 as is shown to particular advantage in Figure 4. The autoplane is provided with the conventional fin, rudder and stabilizer and also the elevator flap as are common to the aeroplanes now in common use.

When in use upon the ground, the machine is driven through a transmission means of which the following is a description: A clutch 24 which is operated from the cock pit by the foot pedal 30 as is shown in Figure 4, or in any other suitable means, which transfers its action through the rod 31 to the clutch lever 32. From this clutch, the transmission of power is carried through a transmission, the case of which is indicated at 33, and which may be of any standard type, to the shaft 24, which through the gears 35 drives the wheels 36, which are shown forwardly of the fuselage in Figure 1 and rearwardly thereof in Figure 4. It is preferable that the transmission be of the progressive type as the remote control of the same is accomplished with greater facility than with the selective type. The operating lever for the transmission is indicated at 37 and is located in the cock pit 22.

Referring now particularly to a steering apparatus for the auto-plane attention is directed to Figure 4 and the auxiliary Figures 5, 6, and 7. A steering means is provided through the front wheels 40, which are supported upon the knuckle joints 41, the lever arms 42 of which are connected by the cross bar 43 which is actuated by the gear 44, which operates upon the rack 45 formed upon the cross bar 43. The gear 44 is rotated through the shaft 46, upon the lower extremity of which it is disposed, and having upon its other extremity the worm wheel 47, which co-acts with the worm 48. This worm and wheel arrangement provides for the absorption of shocks acquired in road travel from the striking of ruts in the roadway, stones, etc., thus preventing undue strain in the cable 49, which is wrapped around and turns the drum 50, and thereby turns the worm 48. The steering control 51 is mounted rigidly upon a turnable shaft 52 extending through the floor of the cock pit and to which is attached a cross bar 53 and the cables 49 and the cables 54 which operate the rudder.

The feature of disconnecting the propeller and driving an aeroplane through its landing gear is of utmost value in the operation of the standard non-folding types when starting from a standing position upon the ground, as it is necessary to gain sufficient speed upon the ground, solely by the use of the propeller, to produce the lift required for flight. The rapid revolving of the propeller required to produce motion from a standstill creates an air current of high velocity which raises large clouds of dust upon unsodded fields and often causing the ruining of the field surface, and making it necessary to expend needless time and money upon repairs. With the use of my invention, the aeroplane may be started from stationary position and accelerated to sufficient speed for flight by the use of its ground transmission, whereupon the propulsion of the same is taken up by the propeller and the machine made to mount into the air. The transmission of power may be accomplished by driving through the front wheels as well as the rear, as I have shown.

The particular form of clutch which I utilize is disclosed in a co-pending application and needs no detailed description herein.

It is thought that the construction, operation, and advantages of this invention will be clearly understood without a more detailed description thereof. It is desired, however, to point out that the present embodiment of the invention has been disclosed merely by way of example and in practice attains the objects enumerated as desirable in the statement of the invention and the above description. It will be apparent that numerous changes in the details of construction, and in the combination and arrangement of parts may be resorted to, without departing from the spirit or scope of the invention as hereinafter claimed or sacrificing any of its advantages.

Having thus described my invention, what I claim as new is:

1. In a vehicle, the combination of a body, retractible wing members extended upon said body, wheels to support said vehicle upon the ground, a motor in said body, a transmission to deliver power from said motor to certain of said wheels to drive the same along the ground, a propeller to drive said vehicle through the air, transmission means between said motor and propeller to drive said propeller, knuckle joints supporting a pair of said wheels, a cross bar between the lever arms of said knuckle joints to maintain relational movement of the same, a rack formed upon said cross bar, a gear meshing with said rack, a shaft to support and rotate said gear; and gearing associated with and acting upon said shaft to rotate the same.

2. In a vehicle, the combination of a body, retractible wing members extending from said body, wheels to support said vehicle upon the ground, a motor in said body, a transmission to deliver power from said motor to certain of said wheels to drive same along the ground, a propeller to drive said vehicle through the air; transmission means between said motor and said propeller to drive said propeller, knuckle joints supporting a pair of said wheels, a cross bar connection between lever arms of said knuckle joints to maintain relational movement of same, a toothed rack upon said cross bar; a gear meshing with said rack, a worm wheel upon said shaft to rotate the same, a worm screw meshed with said worm wheel to rotate same and being provided with an axially extending spool; and a cable wrapped around said spool and having its endes connected with steering control means.

3. An aeroplane including, in combination, a body, a pair of dirigible wheels for supporting the body, knuckle joints mounting said wheels on the body, a cross bar between the lever arms of said knuckle joints to maintain relational movement of the same, a rack formed upon said cross bar, a gear meshing with said rack, a shaft to support and rotate said gear, and gearing associated with and acting upon said shaft to rotate the same.

4. An aeroplane including, in combination, a body, a pair of dirigible wheels, knuckle joints supporting the dirigible wheels on the body, a cross bar connecting the lever arms of said knuckle joints to maintain relational movement of the same, a toothed rack upon said cross bar, a gear meshing with the said rack, a shaft to rotate said gear, a worm wheel upon said shaft, a worm screw meshing with said worm wheel and being provided with an axially extending spool, and a cable wrapped around said spool and having its ends connected with suitable steering control means.

In testimony whereof I affix my signature.

VIRGIL MOORE.